(12) United States Patent
Clark et al.

(10) Patent No.: US 6,627,291 B1
(45) Date of Patent: Sep. 30, 2003

(54) THREE DIMENSIONAL PATTERNED POROUS STRUCTURES

(75) Inventors: Phillip Clark, Wakefield, MA (US); Wilson Moya, Concord, MA (US)

(73) Assignee: Millipore Corporation, Billerica, MA (US)

( * ) Notice: Subject to any disclaimer, the term of this patent is extended or adjusted under 35 U.S.C. 154(b) by 39 days.

(21) Appl. No.: 09/661,104

(22) Filed: Sep. 13, 2000

Related U.S. Application Data

(60) Provisional application No. 60/154,564, filed on Sep. 17, 1999.

(51) Int. Cl.[7] .................. B32B 3/10; B32B 27/14; B32B 3/26; B32B 27/00; A61F 13/15; A61F 13/20; B01D 24/00; B01D 39/00

(52) U.S. Cl. .................... 428/138; 428/198; 428/318.4; 428/318.6; 428/318.8; 428/319.7; 604/379; 604/380; 604/381; 604/382; 210/500.1; 210/500.23; 210/500.27; 210/505

(58) Field of Search .................. 428/198, 138, 428/131, 318.4, 318.6, 318.8, 319.7; 604/379, 380, 381, 382; 210/500.1, 500.23, 500.27, 505

(56) References Cited

U.S. PATENT DOCUMENTS

| | | | | |
|---|---|---|---|---|
| 4,797,259 A | * | 1/1989 | Matkovich et al. | 422/101 |
| 5,271,839 A | | 12/1993 | Moya et al. | 210/490 |
| 5,503,802 A | | 4/1996 | Brown et al. | 422/101 |
| 5,578,024 A | * | 11/1996 | Mizutani et al. | 604/370 |
| 5,627,042 A | | 5/1997 | Hirose et al. | 435/8 |
| 5,851,935 A | * | 12/1998 | Srinivasan et al. | 442/328 |
| 5,858,515 A | * | 1/1999 | Stokes et al. | 428/195 |
| 6,075,682 A | * | 6/2000 | Howey | 360/133 |
| 6,270,875 B1 | * | 8/2001 | Nissing | 428/138 |

FOREIGN PATENT DOCUMENTS

| | | |
|---|---|---|
| EP | 0272043 | 6/1988 |
| EP | 0795600 | 9/1997 |

* cited by examiner

Primary Examiner—Harold Pyon
Assistant Examiner—Patricia L. Nordmeyer
(74) Attorney, Agent, or Firm—John Dana Hubbard; Paul J. Cook

(57) ABSTRACT

The present invention provides new patterned porous substrates and a new method for forming the new patterned porous substrates containing one or more selected patterns which is applicable to all porous structures regardless of their polymeric content, their method of manufacture or their UV absorbing characteristics.

10 Claims, 5 Drawing Sheets

THREE DIMENSIONAL PATTERNED POROUS STRUCTURES

This application claims the benefit of Provisional Application No. 60/154,564, filed Sep. 17, 1999.

The present invention related to three-dimensional porous structures having selected patterns upon and/or in them. More particularly, the present invention relates to three-dimensional porous structures such as membranes that have a series of one or more patterns of porous and non-porous areas.

BACKGROUND OF THE INVENTION

Patterned porous structures have been known. In particular, patterned porous membranes have been used to create membranes having hydrophilic areas separated from each other by a grid like pattern of hydrophobic areas. These membranes have been useful in diagnostic applications and in the collection, culturing, enumeration and identification of microorganisms. Thus, it is desirable in these structures to produce a pattern, which prevents cross talk between the hydrophilic areas so that sample cross contamination is prevented.

U.S. Pat. No. 5,271,839 teaches a process for forming patterns in porous structures. It uses an otherwise non-porous polymeric material which has the desired pattern masked off. It then contacts that material with a solvent that gels the exposed surfaces. The gelled material is then precipitated by exposure to a non-solvent for the polymeric material thereby forming porous structures within the polymeric material in the form of the pattern while the masked areas remain non-porous.

U.S. Pat. No. 5,627,042 teaches a surface modification method in which the surface of a hydrophobic membrane is coated with a cross linked hydrophilic polymer in the shape of a pattern. The entire membrane is first contacted with an appropriate monomer or monomers for hydrophilic coating. Subsequently the hydrophilic pattern is formed by UV initiated polymerization and cross linking of the monomers in selected areas of the membrane by exposing portions of the membrane to the light while masking the other portions from exposure to the light. This process results in a membrane having patterned hydrophilic portions in the areas exposed to the UV light and hydrophobic portions in the area masked from the UV light.

Both of these processes have limitations. For example, the method of the '839 patent is limited in the materials that may be used as some well known polymeric materials such as PTFE resin are difficult or impossible to solvate and therefore not suitable for the process. Even where a solvent is available, many of these solvents are extremely flammable or toxic making their use difficult and or prohibitive. Likewise, the process of the '042 patent is limited in its ability to form such structures due to the required UV absorbing characteristics of the selected polymers or the relative ability of the structures to retain the hydrophilic or hydrophobic characteristics. In addition, the products made by these processes have relatively flat surfaces. These flat surfaces facilitate migration of liquid sample between the porous areas as compared to a porous area pattern wherein the porous areas are positioned at a different height than the isolating non-porous areas.

Accordingly, it would be desirable to provide a patterned porous substrate having improved means for isolating porous areas thereof from each other. In addition, it would be desirable to provide such a patterned porous substrate that can be formed from conventional porous membranes in a simple and an inexpensive manner.

SUMMARY OF THE INVENTION

The present invention provides new patterned porous substrates and a new method for forming the new patterned porous substrates containing one or more selected patterns which is applicable to all porous structures regardless of their polymeric content, their method of manufacture or their UV absorbing characteristics.

The present invention provides a supported three dimensional patterned porous structure formed with areas of porous material and areas of non-porous material formed in the arrangement of a desired pattern of porous and non-porous areas. The three dimensional patterned porous structure is formed from a sandwich that includes a non-porous layer and at least one porous layer. The three dimensional patterned porous structure is formed by collapsing selected portions of the porous structure in the shape of the desired pattern to render these portions non-porous while the remaining portions of the porous layer structure retain the porous structure and are positioned away from the collapsed non-porous structure. Heat and/or pressure are utilized to collapse the selected porous portions while heat, pressure and apparatus geometry are utilized to position the retained porous structure away from the collapsed non-porous structure. The resulting layer formed from the porous layer is collapsed and fused to the non-porous layer of the original sandwich. The process can be applied to any polymeric porous structure of any pore size such as ultrafiltration or microfiltration membranes made by any process such as by precipitation, track etch, stretching, casting, sintering or extrusion. It may also be used on woven and nonwoven porous materials that are collapsible by a combination of heat and pressure. It may also be used with membrane with entrapped particles, such as chromatography media or the like, which are collapsible by a combination of heat and pressure.

DETAILED DESCRIPTION OF THE INVENTION

Figure 1:
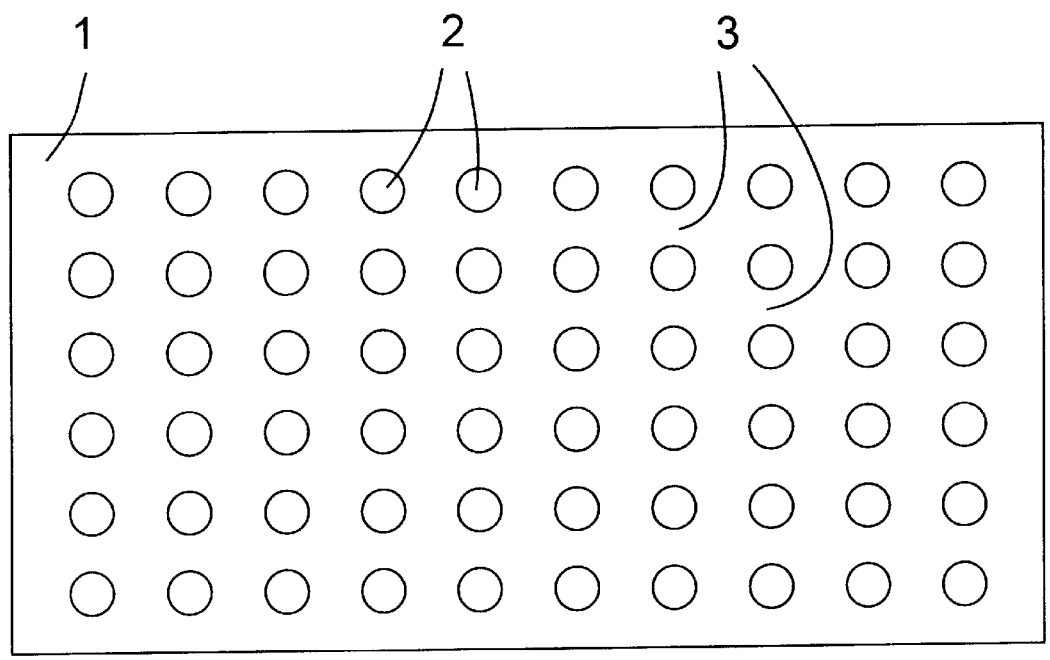
FIG. 1 is a top view of a product of this invention.

The basic premise of the present invention is to modify a porous membrane substrate and selectively collapse portions of the porous membrane structure in the shape of a desired pattern so as to render those areas non-porous while the remaining portions of membrane substrate remain porous and are positioned away from the formed non-porous areas.

It is well known that porous membranes are susceptible to collapse due to their inherent high surface area and porosity which results in an internal structure which is inherently weak due to the small amount of supporting structure holding the membrane together. Porous membranes made from a thermoplastic composition that flows upon the application of heat and pressure become non-porous. Membrane collapse occurs when a membrane is subjected to a mechanical force and/or thermal energy thereby causing the supporting structure of the membrane, which typically amounts to about between 15% and 25% of the volume of the membrane (the rest being air), to collapse and become irreversibly fused into a dense non-porous mass.

Generally, membrane collapse is highly undesirable because it reduces the effective membrane area available for its intended use such as filtration. However, it has now been found that the controlled collapse of selected areas of membrane can be beneficial in certain applications such as in the filtration and/or immobilization of biomolecules in the biotechnology industry. This is particularly true when the collapsed areas are formed in a desired pattern that function to isolate the porous areas of the membranes from each other. Such a patterned structure permits manipulation of samples within the isolated porous areas independently from each other, that is, cross talk between the isolated porous areas is prevented. This isolation is enhanced in the present invention since the porous areas are positioned away from the formed non-porous areas and the areas surrounding the porous areas are supported on a non-porous substrate.

In accordance with the process of this invention, a sandwich of at least one porous membrane and a non-porous layer is subjected to heat and pressure or pressure in selected areas of the membrane to convert these subjected porous areas to a non-porous structure. The remaining areas of the membrane are subjected to some heat without pressure to thereby permit these remaining areas to extrude in a controlled manner within a confined volume. The resulting non-porous areas of the membrane are fused to the non-porous layer of the original sandwich. The thus-treated membrane then is removed from the process conditions of heat and pressure to allow the treated membrane to stabilize such as at normal room temperature and pressure thereby to form isolated porous areas which are positioned on the product of this invention at a different height than the non-porous areas of the treated membrane. By positioning the formed porous areas at a different height on the product, an additional barrier is introduced to prevent cross talk between porous areas. That is, liquid in a given porous area must overcome the non-porous barrier as well as gravity force in order to undesirably migrate into a second porous area.

The products of this invention can be conveniently formed by positioning a sandwich of at least one porous thermoplastic polymeric membrane and a non-porous layer between two platens at least one of which includes spaced apart recesses into which a heated portion of the membrane is free to be positioned while the porous membrane is heated under pressure. The second platen can be flat in which case a product of this invention is produced having a porous portion of its surface at substantially the same height and positioned away from the non-porous portion of the product of this invention.

The product of this invention is supported on and thermally fused to one or two surfaces of a flat thermoplastic polymeric sheet. The supported product of this invention supported on one surface of the flat non-porous thermoplastic polymeric sheet can be conveniently formed by positioning a porous thermoplastic polymeric membrane and the flat non-porous thermoplastic polymeric sheet between two platens wherein one of which includes spaced apart recesses into which a heated portion of the porous membrane is free to be positioned while the porous membrane and flat non-porous thermoplastic sheet are heated under pressure. The second platen is flat in which case a supported product of this invention is produced having a portion of its surface at substantially the same height and positioned away from flat non-porous thermoplastic polymeric sheet and the non-porous portion of the product of this invention.

The supported product of this invention supported on two surfaces of the flat thermoplastic polymeric sheet can be conveniently formed by positioning two porous thermoplastic polymeric membranes each on an opposing surface of the flat non-porous thermoplastic polymeric sheet to form a sandwich which, in turn, is between two platens wherein each of which includes spaced apart recesses into which a heated portion of one of the porous membranes is free to extrude while the porous membranes and flat thermoplastic sheet are heated under pressure. In this aspect of this invention, a product of this invention is produced having a first membrane having a portion of its surface at a first given height and positioned away from the non-porous portion of the first membrane and the flat non-porous thermoplastic polymeric sheet and a second membrane having a portion of its surface at a second given height and positioned away from the non-porous portion of the second membrane and the flat non-porous thermoplastic polymeric sheet. The first given height and the second given height extend in opposite directions away from the flat non-porous thermoplastic sheet.

In another aspect of this invention, the supported product of this invention supported on a surface of a non-porous flat thermoplastic polymeric sheet having spaced apart holes therein of a desired pattern can be conveniently formed by positioning a porous thermoplastic polymeric membranes on a surface of the flat non-porous thermoplastic polymeric sheet to form a sandwich which, in turn, is between two platens. One platen includes spaced apart recesses into which a heated portion of the porous membrane as well as a portion of the non-porous layer are free to extrude into while the porous membrane and flat thermoplastic sheet are heated under pressure. The holes in the non-porous flat thermoplastic polymeric sheet are aligned with the recesses with the spaced apart recesses in the platen. In this aspect of this invention, a product of this invention is produced having discrete porous portions supported by portions of the original non-porous flat thermoplastic polymeric sheet.

The time and temperature at which the process of this invention is run will depend upon the thermal properties of the porous membrane being treated as well as the thermal properties of the polymeric support sheet.

Figure 2:
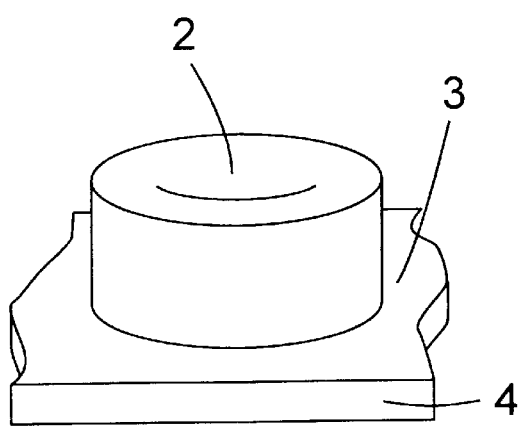
FIG. 2 is an isometric view of a portion of the supported product of FIG. 1.
Figure 3:
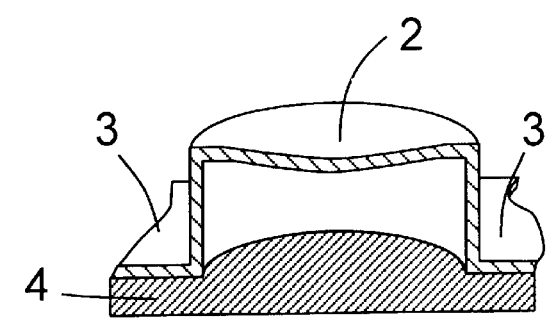
FIG. 3 is a cross-sectional view of a portion of the supported product of FIG. 2.
Figure 8:
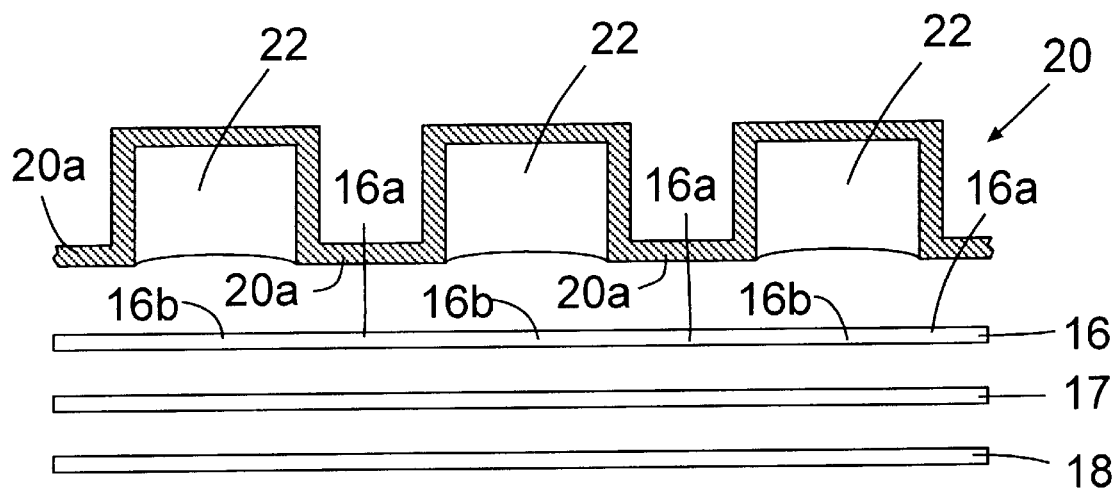
FIG. 8 illustrates the method of making the supported product of FIGS. 2 and 3.

Referring to FIGS. 1, 2 and 3, a membrane structure 1 that has one or more areas of porous materials 2 and one or more non-porous areas 3. In this arrangement, the non-porous areas 3 are formed as a series intersecting areas that form a series of grids, the interior of each are formed of porous material 2. Such gridded membranes are useful in many applications such as in the analysis of microbes in fluids such as water, beverages, pharmaceuticals and other liquids, as targets for sample analysis by a method such as optical reflectance of MALDI-TOF mass spectrometry. The gridded membranes also are useful for capture of sample in the discrete porous zones by immunoassay techniques. When forming the supported membrane structure of this invention, a flat non-porous thermoplastic sheet 4 is positioned in contact with a flat porous membrane to form a sandwich that is to be formed. The sandwich is positioned between a flat platen that contacts the non-porous flat sheet 4 and a platen having recesses of a height that permits the porous membrane to extrude or be displaced into the recess during processing. The platen having recesses contacts the porous membrane. The recesses typically can vary in height between about 0.001 inch (25 microns) and about 1 inch (25 mm). The process of this invention embodiment of this invention will be described with reference to FIG. 8. Referring to FIG. 8, a porous membrane 16 and a non-porous thermoplastic sheet 17 are positioned between a flat platen 18 and a platen 20 having recesses 22 of a height which permits the porous membrane 16 to expand into the recesses 22 during processing. The platens 18 and 20 are closed onto the membrane 16 and the non-porous sheet 17 under pressure, usually between about 100 psig (7 bar) and about 5,000 psig (345 bar), preferably between about 1000 psig (69 bar) and about 3000 psig (207 bar). The platen 20 is heated to a temperature dependent upon the thermal characteristics of the membrane 16 and the thermoplastic sheet 17 to allow the membrane portions 16b to extrude into recesses 22 without destroying the porosity of the membrane 16 and to fuse the thermoplastic sheet 17 to the membrane portions 16a. The membrane portions 16a are compressed between the flat portion 20a of platen 20 and platen 18 to render the membrane portions 16a non-porous.

Figure 4:
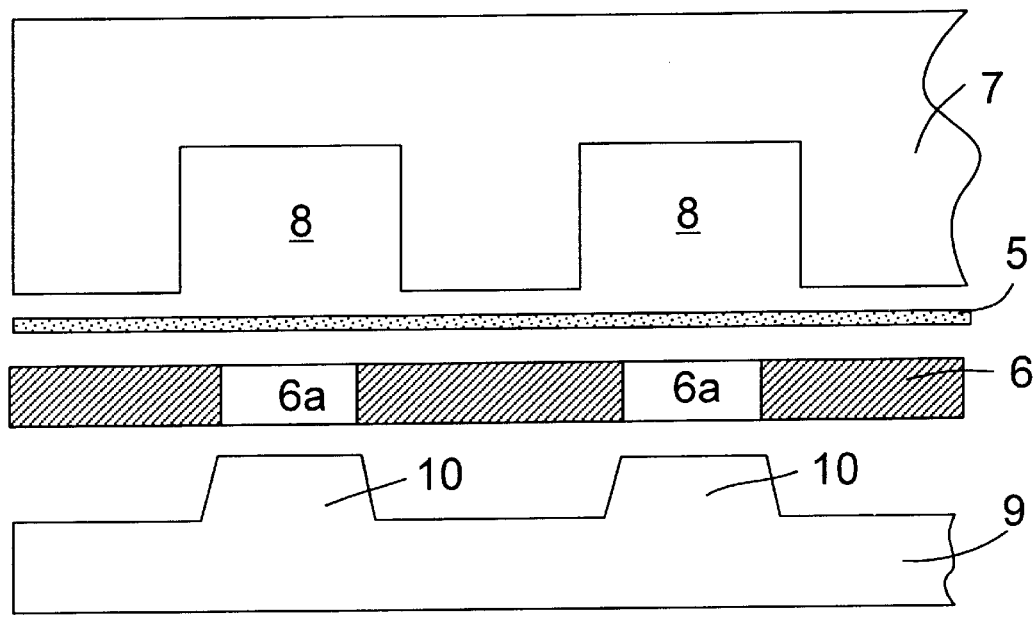
FIG. 4 is a cross-sectional view of an apparatus for making one embodiment product of this invention.
Figure 5:
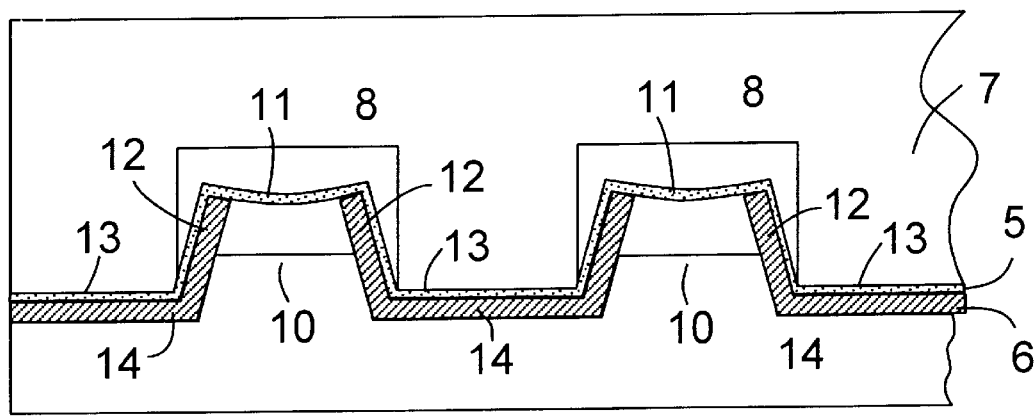
FIG. 5 illustrates the method of making the unsupported product of FIG. 4.

An alternative embodiment of this invention is shown in FIGS. 4 and 5 wherein a sandwich formed of a porous membrane layer 5 and a non-porous thermoplastic sheet 6 having spaced apart holes 6a are positioned between a platen 7 having recesses 8 and a platen 9 having extensions 10. As shown specifically in FIG. 5, a portion 11 of the porous membrane 5 and a portion 12 of sheet 6 are displaced into recesses 8. The remaining portions 13 of the membrane 5 and the remaining portions 14 of sheet 6 are fused together to form non-porous areas in the final product. In this embodiment, the portion of the porous membrane 11 covering holes 6A in thermoplastic sheet 6 are free to pass liquid. This embodiment of this invention can be formed under the process conditions set forth above.

Figure 6:
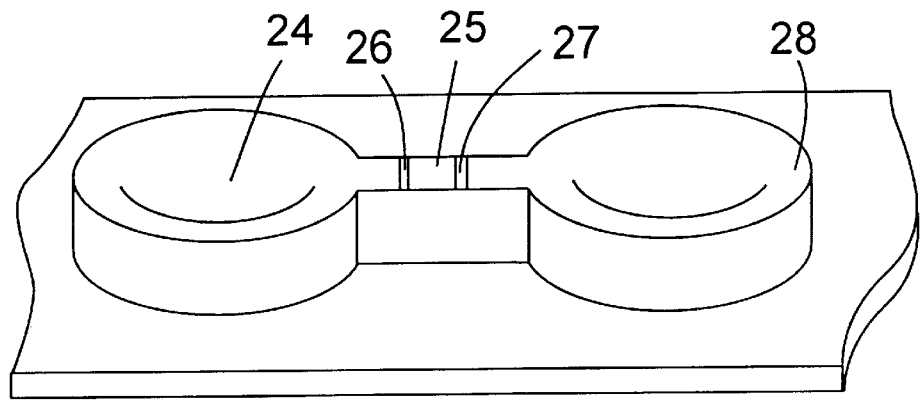
FIG. 6 is an isomeric view of a formed product of this invention.

A product of this invention is shown in FIG. 6 wherein a sample such as a biological sample can be introduced onto porous area 24 and, under capillary action can be transported through path 25 having reagent zones 26 and 27 containing antigens, for example and into porous detection zone 28 containing a detection chemistry such immunoassay, ELISA, as is well known in the analytical arts.

Figure 6A:
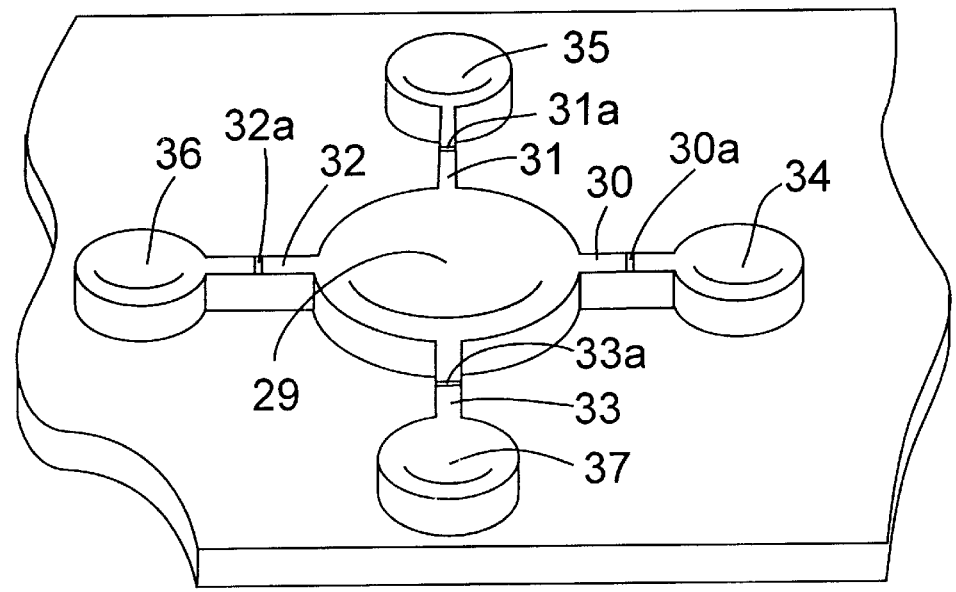
FIG. 6a is an isomeric view of an alternative formed product of this invention

An alternative product of this invention is shown in FIG. 6a wherein a sample such as a biological sample can be introduced onto porous area 29 and, under capillary action can be transported through paths 30, 31, 32, and 33 through capture zones 30a, 31a, 32a and 33a containing antibodies, for example and into porous detection zones 34, 35, 36 and 37 containing a detection chemistries such as is well known in the analytical arts. In this embodiment, a single sample can be simultaneously with a plurality of different chemistries.

Figure 7:
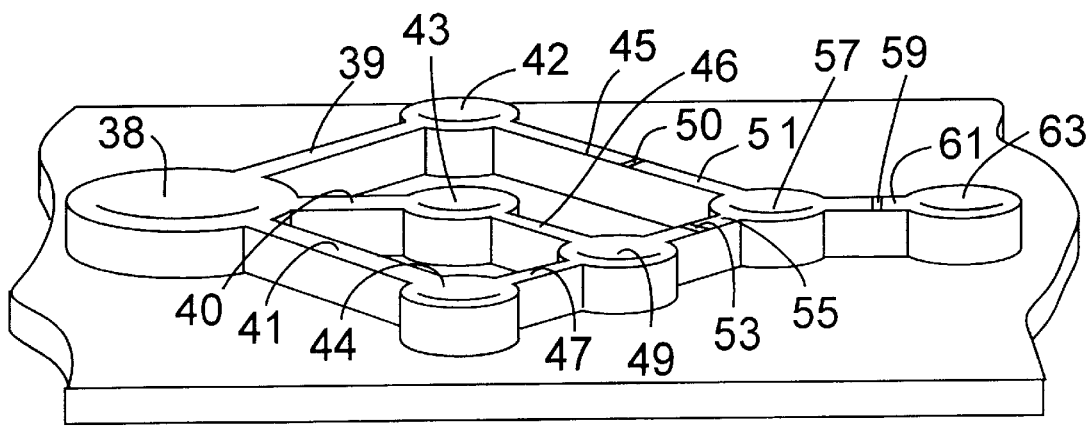
FIG. 7 is an isomeric view of an alternative formed product of this invention

An alternative product of this invention is shown in FIG. 7 wherein a sample such as a biological sample can be introduced onto porous area 38 and, under capillary action can be transported through paths 39, 40 and 41 to porous zones 42, 43 and 44 wherein portions of the sample are contacted with a reagent. The sample portions and reagents then travel by capillary action through paths 46 and 47 to be mixed in porous zone 49 or through path 45 to contact capture zone 50. The sample-reagent mixtures from path 51 and from contact zone 53 and path 55 are mixed in porous zone 57. The sample-reagent mixture from zone 57 passes through contact zone 59 in path 61 and into detection zone 63 containing a detection chemistry. In this embodiment, a single sample can be mixed with a plurality of reagents sequentially.

Figure 9:
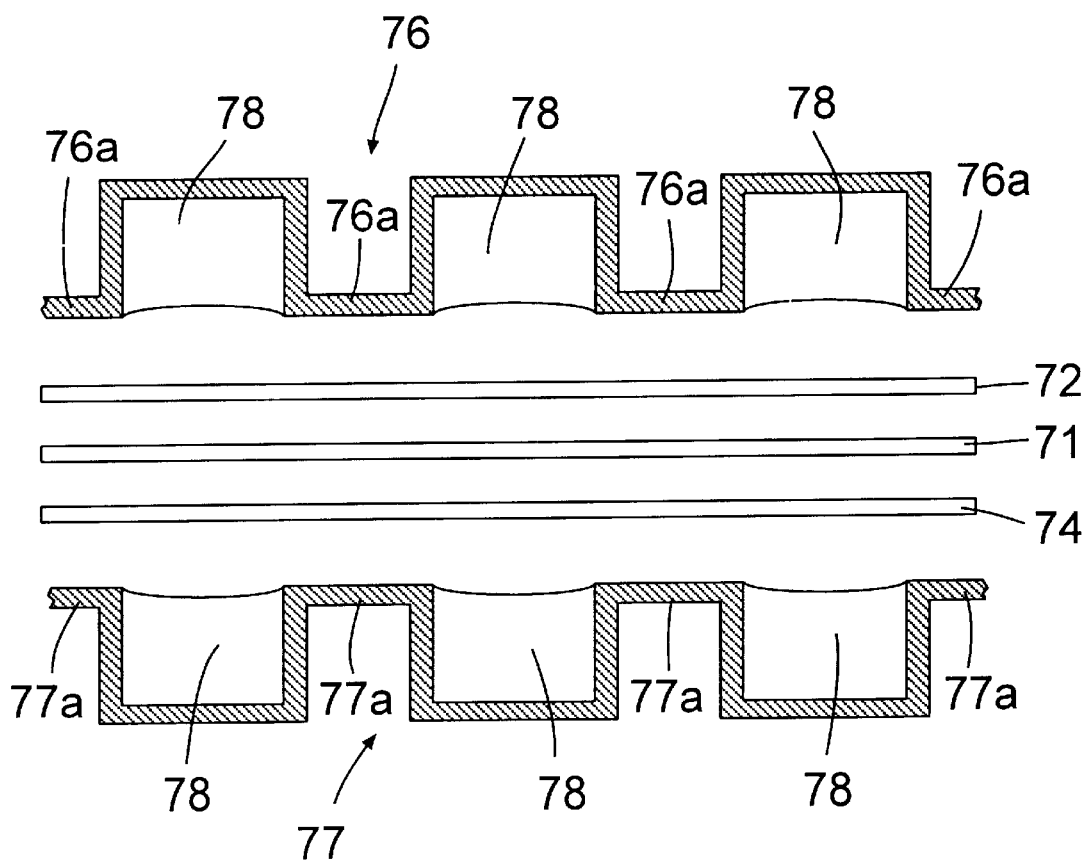
FIG. 9 illustrates the method of making the supported product of FIG. 10.
Figure 10:
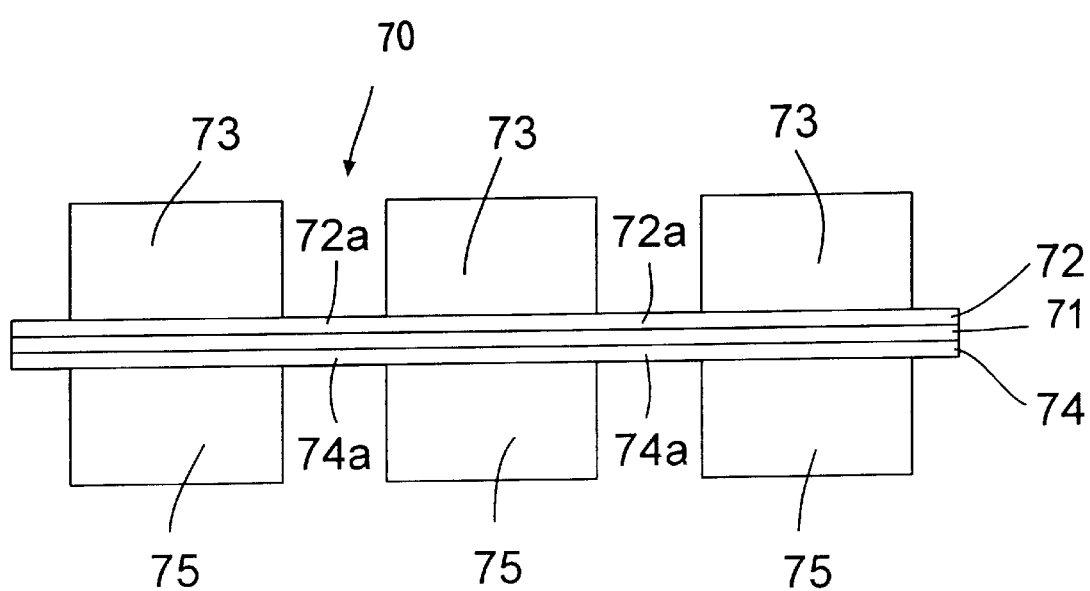
FIG. 10 is a side view of a supported product of this invention.

An alternative embodiment of this invention is shown in FIG. 10 that is formed in a manner described with reference to FIG. 9. Referring to FIG. 10, a supported membrane product of this invention 70 includes a non-porous thermoplastic support sheet 71, a first membrane layer 72 having a first set of porous portions 73 and a second membrane layer 74 having a second set of porous portions 75. The membrane product 70 is formed by positioning a sandwich comprising a non-porous thermoplastic sheet 71, a first porous membrane 72 and a second porous membrane 74 between two platens 76 and 77 each having recesses 78 of a height which permits the porous membranes 72 and 74 to expand into the recesses 78 during processing. The platens 76 and 78 are closed onto the plastic sheet 71 and the membranes 72 and 74 under pressure, usually between about 100 psig (7 bar) and about 5,000 psig (345 bar), preferably between about 1000 psig (67 bar) and about 3000 psig (207 bar). The platens 76 and 77 are heated to a temperature dependent upon the thermal characteristics of the non-porous thermoplastic sheet 71 and the membranes 72 and 74 to allow the membrane portions 73 and 75 to expand into recesses 78 without destroying the porosity of the membrane portions 73 and 75. In addition, heating is effected to fuse the non-porous portions 72a and 74a of the membranes to the non-porous sheet 71. The membrane portions 72a and 74a are compressed between the flat portions 76a of platen 76 and flat portions 77a of platen 77 to render the membrane portions 72a and 74a non-porous.

The product of the present invention and the process by which it is made can be applied to any porous membrane that is subject to collapse. Preferably, it is of particular use with any polymeric porous membrane of any pore size, such as reverse osmosis, ultrafiltration, microfiltration, macrofiltration, any configuration such as symmetrical or asymmetrical, skinned or unskinned and made by any process such as precipitation, casting, extrusion, track etching, sintering, stretching and other such well-known methods. Additionally, this process can be used on woven and nonwoven fabrics.

The polymeric material that forms the preferred porous membrane that may be used to form the product of the present invention is not limited as occurred with the prior art products and processes for forming patterned membranes. For example, one is not limited to materials that form gelled structures in the presence of a solvent. This means one can use materials that are difficult if not impossible to solvate due to the lack of appropriate solvents for the material, such as PTFE resin. Additionally one may use UV absorbent polymers such as polyethersulphone that was not possible with the known prior art techniques. These polymers can include semicrystalline or amorphous polymers, hydrophilic polymers or hydrophobic polymers. In addition, the polymers can be filled polymers such as those containing small silica beads coated with a marker such as an antigen, an antibody or a DNA marker. Likewise, filled membranes may also be used in this process. Such membranes are well known in the art and typically contain ion exchange resins or chromatography media embedded in the matrix of the membrane. One such material is sold by 3M of Minneapolis, Minn. under the name of Empore® membranes.

Preferred polymers include but are not limited to polyolefins such as polyethylene, including ultrahigh molecular weight polyethylene, polypropylene and various polyolefin copolymers and terpolymers, PTFE resin and thermoplastic perfluoropolymers such as PFA, PVDF, nylon, polyamides, polyimides, polyethersulphones, polysulphones, polyarylsulphones, PVC, PET, polycarbonates, cellulose, cellulose esters such as cellulose acetate or cellulose nitrate, polystyrenes, polyetherimides, acrylic polymers, methacrylic polymers, copolymers of acrylic or methacrylic polymers, blends of any of the above and the like.

The selected membranes may be surface modified either before or after the pattern formation so as to provide a specific surface characteristic such as hydrophilicity, hydrophobicity, charge, affinity ligands and the like.

The shape of the porous portions of the membrane structure of this invention can be any which is useful such as the traditional round or rectangular shaped membranes, although other shapes can be used.

The shape of the porous portions of the membrane structure of their invention can be a series of interconnected porous zones.

The following examples illustrate the present invention and are not intended to limit the same.

EXAMPLE 1

A patterned porous/non-porous supported membrane was made according to the teachings of the present invention. A sheet of polyvinylidene difluoride (PVDF) (Durapore® DVPP) with a 0.65 micron pore size rating available from Millipore Corporation of Bedford, Mass. was placed onto a thermoplastic polyethylene terephthalate (PET) non-porous 0.015 inch (0.38 mm) thick sheet was placed between two platens, the spacing between which controlled by a hydraulic press. A top platen in contact with the porous membrane had an array of 384 recesses cut to 0.125 inch (3.2 mm) diameter and 0.03 inch (0.76 mm) deep. The lower platen in contact with the thermoplastic non-porous sheet was flat. The press was closed to effect a compressive force of 2700 psi (186 bar) while the top platen heated to a temperature of about 180° C. and the lower platen had a temperature of 40° C. The compressive force was held for 30 seconds.

The Durapore® membrane was collapsed and fused to the PET sheet area surrounding the recesses in the top platen, an array of 384 bosses was formed with porous membrane, Durapore® covering the upper surfaces of the raised boss. The bosses that were formed were about 0.125 inch (3.2 mm) diameter and 0.030 inch (0.76 mm) high.

A second product having the same configuration and formed from the same materials was formed at 1,400 psig (97 bar), for 30 seconds with the top platen at 160° C. and the bottom platen at 70° C.

What is claimed is:

1. A patterned porous substrate comprising a non-porous substrate fused to a porous substrate having one or more areas of porous material and one or more areas of non-porous material, said one or more areas of porous material of said porous substrate being positioned away from said areas of non-porous areas of said porous substrate and at a different height than the non-porous areas of the porous substrate and said non-porous areas of said porous substrate being fused to said nonporous substrate.

2. The patterned substrate of claim 1 wherein the areas of porous material are arranged in a manner so as to be separate and distinct from each other and separated by a non-porous structure.

3. The patterned substrate of claim 1 wherein the one or more areas of porous material are of a shape selected from the group consisting of circles ovals, polygons and mixtures thereof.

4. A patterned porous filtration device comprising a non-porous substrate fused to a porous polymeric membrane substrate selected from the group consisting of reverse osmosis, ultrafiltration and microporous membranes, the membrane substrate having one or more areas of porous materials and one or more areas of nonporous material, said nonporous substrate having one or more holes, said one or more areas of porous material covering said holes, said nonporous areas of the porous polymeric membrane substrate being fused to said nonporous substrate, said one or more areas of porous material being positioned away from the one or more areas of nonporous material in the porous membrane polymeric substrate and the nonporous substrate by a height different from that of the nonporous substrate.

5. A patterned filtration device comprising of a nonporous substrate, a first porous membrane substrate having a porous and nonporous area, said first porous membrane substrate being fused to one surface of said nonporous substrate in the nonporous area of the first porous membrane substrate, a second porous membrane substrate having a porous and nonporous area, said second porous membrane substrate being fused to a second surface of said nonporous substrate in the nonporous area of the second porous membrane substrate, said first and second areas of porous material being positioned away from said first and second areas of nonporous areas of the first and second porous membrane substrates by a height different from that of the nonporous areas of the first and second porous membrane substrates.

6. The patterned substrate of claim 1 wherein at least two areas of porous material are joined by a pathway of porous material.

7. The patterned substrate of claim 4 wherein at least two areas of porous material are joined by a pathway of porous material.

8. The substrate of claim 1 wherein the one or more areas of porous material of said porous substrate is at a height of between 0.001 and about 1 inch above the non-porous regions of the porous substrate.

9. The substrate of claim 4 wherein the one or more areas of porous material of said porous substrate is at a height of between 0.001 and about 1 inch above the non-porous regions of the porous substrate.

10. The substrate of claim 5 wherein the one or more areas of porous material of said porous substrate is at a height of between 0.001 and about 1 inch above the non-porous regions of the porous substrate.

* * * * *